United States Patent
Fuhlbrigge et al.

(10) Patent No.: US 9,919,602 B2
(45) Date of Patent: Mar. 20, 2018

(54) DRIVE INVERTER SHARED BY DIFFERENT MOTORS IN A VEHICLE

(71) Applicant: ABB Schweiz AG, Baden (CH)

(72) Inventors: Thomas A. Fuhlbrigge, Ellington, CT (US); Carlos Martinez, South Windsor, CT (US); Harald Josef Stabb, Windsor, CT (US); Gregory F. Rossano, Enfield, CT (US)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 14/780,542

(22) PCT Filed: Mar. 26, 2014

(86) PCT No.: PCT/US2014/031793
§ 371 (c)(1),
(2) Date: Sep. 27, 2015

(87) PCT Pub. No.: WO2014/160738
PCT Pub. Date: Oct. 2, 2014

(65) Prior Publication Data
US 2017/0144547 A1    May 25, 2017

Related U.S. Application Data

(60) Provisional application No. 61/805,819, filed on Mar. 27, 2013.

(51) Int. Cl.
*B60L 1/00*          (2006.01)
*B60L 15/00*         (2006.01)
(Continued)

(52) U.S. Cl.
CPC ........... *B60L 1/003* (2013.01); *B60L 11/1803* (2013.01); *B60L 11/1864* (2013.01);
(Continued)

(58) Field of Classification Search
CPC .... B60L 1/003; B60L 11/1803; B60L 15/007; B60L 2260/32; B60L 2240/421; B60L 2240/425; B60L 2200/44
See application file for complete search history.

(56) References Cited

U.S. PATENT DOCUMENTS 5,717,310 A * 2/1998 Sakai .................. B60L 11/1862
                                                            307/10.1
6,917,179 B2 * 7/2005 Komatsu ............... B60L 3/0023
                                                            318/434
(Continued)

FOREIGN PATENT DOCUMENTS

EP         1819026         8/2007
EP         2050611         4/2009
(Continued)

OTHER PUBLICATIONS

International Search Report and Written Opinion, PCT/US2014/031793, ISA/EP, ABB Technology AG, Nov. 26, 2014, 10 pgs.
(Continued)

*Primary Examiner* — Drew J Brown
(74) *Attorney, Agent, or Firm* — Taft Stettinius & Hollister LLP

(57) ABSTRACT

The drive inverter units that power the traction motors and steering motors of a manned or unmanned vehicle such as a mobile robot or automated guided vehicles (AGVs), industrial trucks or remote controlled vehicles that are equipped with a robot arm or other actuated mechanisms are also used to power the axes of the robot arms or other additional high power actuators (e.g. a lift table). The traction and steering motors can be disconnected from the drive and the motors of a robot arm or actuator can be connected to the drive and vice versa. The prerequisite is that driving and robot arm/actuator motion do not take place at the same time.

18 Claims, 4 Drawing Sheets

(51) Int. Cl.
 B60L 11/18 (2006.01)
 B60L 15/20 (2006.01)
(52) U.S. Cl.
 CPC ........ B60L 11/1877 (2013.01); B60L 15/007 (2013.01); B60L 15/20 (2013.01); *B60L 2200/44* (2013.01); *B60L 2240/421* (2013.01); *B60L 2240/425* (2013.01); *B60L 2260/32* (2013.01); *Y02P 90/60* (2015.11); *Y02T 10/645* (2013.01); *Y02T 10/7005* (2013.01); *Y02T 10/7061* (2013.01); *Y02T 10/7275* (2013.01)

(56) References Cited

U.S. PATENT DOCUMENTS

| | | | | |
|---|---|---|---|---|
| 7,164,253 B2 * | 1/2007 | Sato | ................... | B60L 11/1803 318/105 |
| 7,764,044 B2 * | 7/2010 | Ishikawa | ................ | B60K 6/445 307/45 |
| 8,039,976 B2 * | 10/2011 | Sato | ........................ | B60K 6/48 290/40 C |
| 8,274,173 B2 * | 9/2012 | King | ....................... | B60L 1/003 307/9.1 |
| 8,400,100 B2 * | 3/2013 | Takizawa | ................ | B60L 3/003 318/803 |
| 8,736,218 B2 * | 5/2014 | Matsuyama | ....... | B60H 1/00764 318/139 |
| 2010/0181829 A1 * | 7/2010 | Ichikawa | ............ | B60L 11/1861 307/9.1 |
| 2010/0242481 A1 * | 9/2010 | Shamoto | ................. | B60L 1/003 60/698 |
| 2012/0119683 A1 | 5/2012 | Matsuyama | | |

FOREIGN PATENT DOCUMENTS

| | | |
|---|---|---|
| WO | 2003055715 | 7/2003 |
| WO | 2010043640 | 4/2010 |

OTHER PUBLICATIONS

Anonymous "Mobile Robot Arm Demo", Feb. 27, 2007, XP054975593. Retrieve from the Internet URL: http://www.youtube.com/watch?v=yG88zUupf0Q, retrieved Oct. 31, 2014 by the EP searching authority.

* cited by examiner

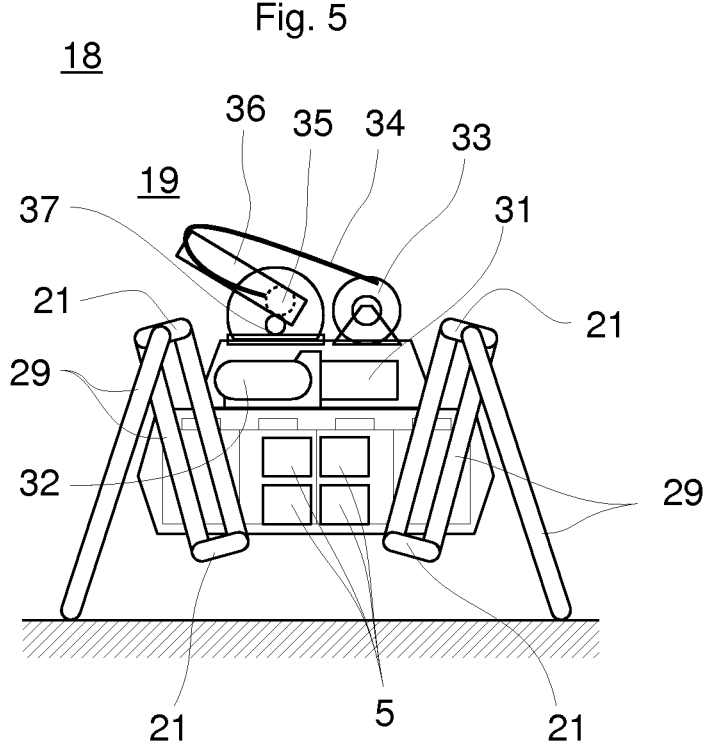

DRIVE INVERTER SHARED BY DIFFERENT MOTORS IN A VEHICLE

FIELD OF THE INVENTION

This invention relates to mobile robots, automated guide vehicles (AGVs), industrial trucks or remote controlled vehicles that are equipped with a robot arm or other actuated mechanisms hereinafter referred to individually or collectively as a vehicle or vehicles be they manned or unmanned.

DESCRIPTION OF THE PRIOR ART

The vehicle(s) each comprise electric motors for an actuated locomotion mechanism, that is, locomotion motors. Locomotion motors as used herein means one or more traction motors and may also, depending on vehicle type, include in addition to the one or more traction motors, one of more steering motors and one or more braking motors. The vehicle(s) also comprise electric motors for other actuators, a power supply and electric equipment for power distribution. Typical examples of power supplies are batteries, small combustion engines or inductive power transmission from the ground. Typical examples of a locomotion mechanism, include but are not limited to powered wheels, caterpillars, mecanum-wheels, and legs.

Individual drive inverter units are used to power the traction and steering, that is locomotion, motors of the vehicle as well the axes of the robot arms or other additional high power actuators such as for example a lift table.

SUMMARY OF THE INVENTION

A vehicle has two or more electric motors. One of the two or more motors is used for locomotion for the vehicle. All others of the two or more motors are used for other than locomotion of the vehicle with only one of the two or more motors in use at a given time. The vehicle also has at least one drive inverter unit for providing power to the two or more motors but only to that one of the two or more motors that is in use at the given time.

A vehicle has a multiplicity of electric motors. A predetermined number of these motors are used to provide locomotion to the vehicle and all others of the multiplicity of electric motors used for other than locomotion of the vehicle. The vehicle also has a multiplicity of drive inverter units each for providing power to an associated one of the predetermined number of electric motors used to provide locomotion to the vehicle and to an associated one or more of the all others of the multiplicity of electric motors used for other than locomotion of the vehicle but at a given time each of the multiplicity of drive inverter units providing power only to either the associated one of the predetermined number of locomotion providing electric motors or to one of the associated one or more of the all other motors used for other than locomotion.

A method for electrically powering a vehicle that has two or more electric motors with only one of the two or more motors in use at a given time and at least one drive inverter unit. In this method:
one of the two or more motors is used for traction for the vehicle;
all others of the two or more motors are used for other than traction of the vehicle; and
the at least one drive inverter unit for delivering electric power to the two or more motors is shared between the two or more electric motors but the at least one drive inverter unit only delivering at a given time electric power to that one of said two or more motors that is in use at said given time.

DESCRIPTION OF THE DRAWING

FIG. 1b shows a bottom view of the robot shown in FIG. 1a.

FIG. 2b shows a robot mounted on the lift table of the vehicle shown in FIG. 2a.

FIG. 5 shows an embodiment wherein the vehicle has legged mechanisms for locomotion.

DETAILED DESCRIPTION

Figure 1A:
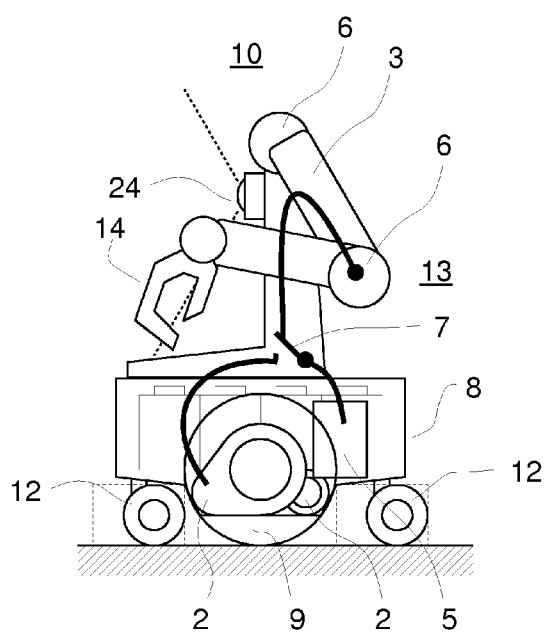
FIG. 1a shows a side view of one embodiment for a wheeled mobile robot.
Figure 1B:
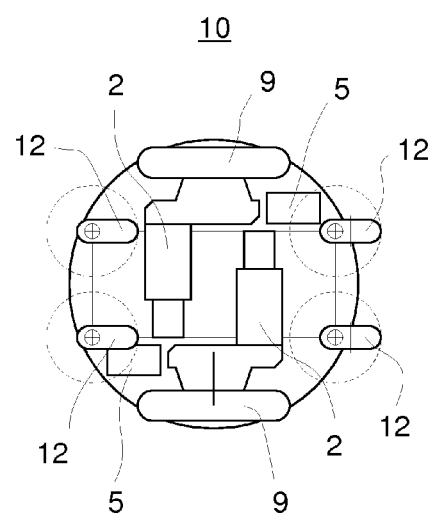

FIG. 1a shows a side view of one embodiment for a wheeled mobile robot 10 and FIG. 1b shows a bottom view of mobile robot 10. As shown in these figures, the mobile robot 10 has a mobile platform 8 that has two powered wheels 9 each with a traction motor 2 that may have an optional gearbox, differential steering, and one or more supporting casters 12. While not shown in FIGS. 1a and 1b, mobile robot 10 may optionally have one or more steering motors.

Mobile robot 10 also has a drive inverter 5 and a switching unit 7 that is shown as side mounted in FIG. 1a but can be located anywhere on robot 10. The switching unit 7 may be integrated in the drive inverter 5 or a separate unit such as a relay.

The switching unit 7 contains a relay type of switch that is rated to connect the power connections of a motor such as motor 2 or the other motors described below to the drive inverter 5. Optionally the switching unit 7 may also contain an electromechanical (relay-type) or electronic switch for signal lines between the motor and the inverter drive 5. Examples of signal lines are motor temperature output, motor hall sensor output, motor encoder output, motor tachometer output.

Mobile robot 10 further has, as shown in FIG. 1a, a robot 13 mounted on mobile platform 8. Robot 13 has an arm 3 that has one or more joints, that is, actuated mechanisms 6. Attached to the end of arm 3 is a tool 14 that can optionally have an actuatable mechanism at the attachment of tool 14 to arm 3.

The side mounted switching unit 7 connects only one of the motors described above to the power electronics (not shown) of the drive inverter 5. Thus drive inverter 5 does not power two or more of these motors at the same time.

Optionally the drive inverter 5 can store parameter sets and configuration data of two or more different motors and can switch between this data during runtime, provided that the connected motor is not moving.

As shown in FIG. 1a, mobile robot 10 which could be remotely controlled has mounted on it sensors 24 such as cameras or laser scanners. The sensors 24 provide data for the system, or to the operator of mobile robot 10 that the operator uses in his or her remote control of mobile unit 10.

Figure 2A:
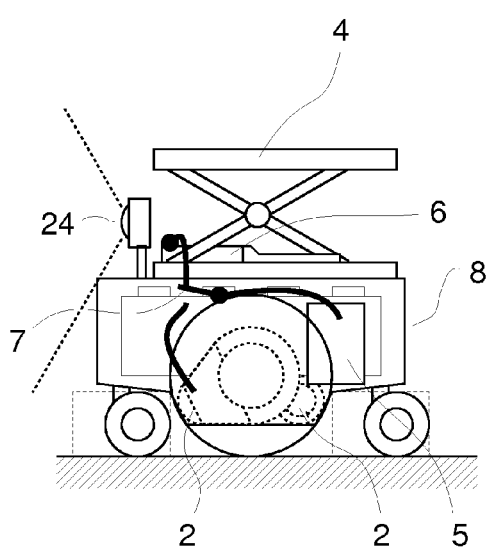
FIG. 2a shows an embodiment for a wheeled vehicle that has a lift table.

Referring now to FIG. 2a, there is shown another embodiment wherein there is mounted on mobile platform 8 a lift table 4 instead of robot 13. Elements having reference numerals in FIG. 2a that are identical to those shown in FIGS. 1a and 1b have the same function as does the element in FIGS. 1a and 1b and thus do not have to be described here in detail. In this embodiment, the drive inverter 5 is shared between the traction motors 2 and the motors of other actuated mechanisms such as the motor 6 for lift table 4.

Figure 2B:
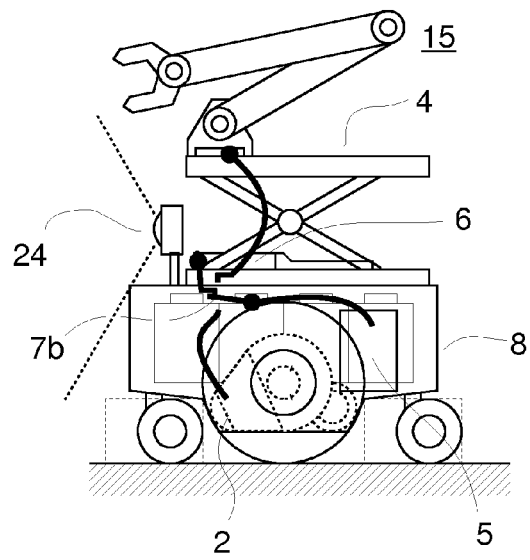
Figure 3:
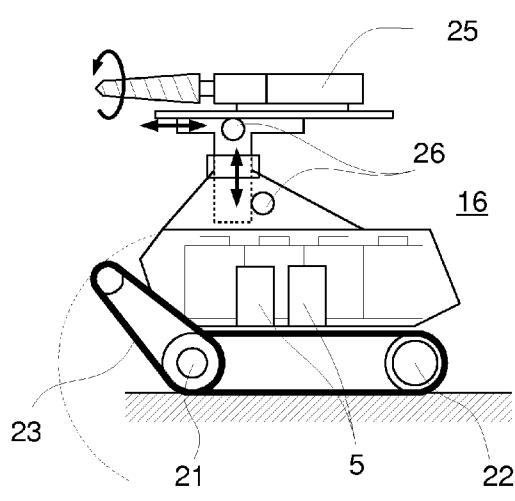
FIG. 3 shows an embodiment wherein a mobile platform has wheels or caterpillars on articulated mechanisms.

Referring now to FIG. 2b, there is shown an embodiment wherein a robot 15 is mounted on the lift table 4 that is mounted on mobile platform 8. Elements having reference numerals in FIG. 2b that are identical to those shown in FIG. 2a have the same function as does the element in FIG. 2a and thus do not have to be described here in detail. In this embodiment, the drive inverter 5 is shared between the traction motors 2 and the motors of other actuated mechanisms such as the motor 6 for lift table 4 and the motors for the arms of robot 15. It should be appreciated that the inverter 5 can be shared between three or more motors that are not used at the same time by the use of the switching unit 7b Referring now to FIG. 3, there is shown an embodiment wherein a mobile platform 16 has wheels or caterpillars on articulated mechanisms 23 that allow for better mobility in rough terrain. In this embodiment, the drive inverter 5 is shared between the motor 21 of the articulated mechanism 23 and the motors 26 of other attached mechanisms. As shown in FIG. 3, the other attached mechanism in this embodiment is a powered drill 25 and the motors 26 move drill up and down and backward and forward as shown by the arrows in FIG. 3.

Figure 4:
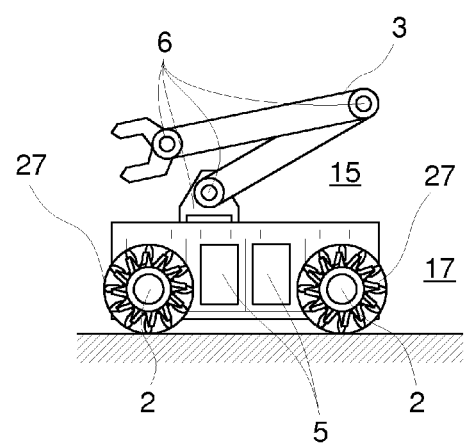
FIG. 4 shows an embodiment wherein a mobile platform has three or four omni-directional wheels that are mecanum wheels each with a traction motor.

Referring now to FIG. 4, there is shown an embodiment wherein a mobile platform 17 has three or four omni-directional wheels, that is, mecanum wheels, 27 each with a traction motor 2. A robot 15 is mounted on mobile platform 17. In this embodiment, the drive inverters 5 are shared between the traction motors 2 and the motors of other actuated mechanisms such as the motors 6 for the axes of robot 15.

Referring now to FIG. 5, there is shown an embodiment wherein a vehicle 18 has legged mechanisms 29 for locomotion. While not shown in FIG. 5, the vehicle 18 may have combinations of wheels and legs for locomotion in place of legged mechanisms 29. Elements having reference numerals in FIG. 5 that are identical to those shown in FIGS. 1 to 4 have the same function as does the element in FIGS. 1 to 4 and thus do not have to be described here in detail.

The vehicle 18 has an attached mechanism that is a shooting device 19 with a gun 36 that optionally can have a pan-tilt aiming mechanism 37. The gun 36 can shoot a probe 35 or a sensor (not shown). It may be necessary to shoot or throw the probe 35 or sensor into or onto something that needs to be sensed. Examples are a vibration sensor with a magnet that is thrown onto a gearbox to record a noise pattern; or an oxygen sensor that is thrown into a sewage treatment basin to monitor the quality of purification; or a thermometer with a magnet that is thrown onto a pipe to measure its temperature.

The gun 36 can be fired with pressurized air, e.g. by discharging a pressure tank 32. Air is supplied to pressure tank 32 by an air compressor that has a regulated motor 31. The probe 35 is either abandoned or recovered with a cord 34 that is uncoiled at the shot and coiled back on a pulley 33 for recovery. The cord 34 can also be used to host power supply and data lines to the probe 35.

The four drive inverters 5 shown in FIG. 5 are shared between the motor 21 of the articulated mechanism 29 and the motors of the shooting device 19 and the motor 31. The four drive inverters 5 can power either the articulated mechanism 29 which here are four legs or the other motors such as those used in the pump, pulley, pan, and tilt. This is only one example of many others possibilities of how the motors share the drive inverters 5.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A vehicle comprising at least one actuated mechanism and further comprising:
    two or more electric motors, one of said two or more motors used for locomotion of said vehicle and all others of said two or more motors used for other than locomotion of said vehicle, said all others of said two or more motors comprising one or ore electric motors connected to said at least one actuated mechanism, with only one of said two or more motors being powered at a given time; and
    at least one drive inverter unit shared between said two or more motors and configured for providing power to said only one of said two or more motors at said given time, wherein said at least one driver inverter unit is further configured for storing for each of said two or more motors that is not powered at said given time an associated set of parameters and configuration data in order to provide data for controlling the vehicle.

2. The vehicle of claim 1, wherein said at least one drive inverter unit switches between said stored associated set of parameters for each said two or more motors as said drive inverter unit switches between providing power to one of said two or more motors to another of said two or more motors.

3. The vehicle of claim 1 wherein said vehicle is a mobile platform.

4. The vehicle of claim 3 wherein said mobile platform comprises two powered wheels each with an associated traction motor.

5. The vehicle of claim 3 further comprising a robot mounted on said mobile platform.

6. The vehicle of claim 5 wherein said robot has an arm with one or more of said actuated mechanisms with an associated motor that receives power from said at least one drive inverter unit.

7. The vehicle of claim 3 further comprising a lift table mounted on said mobile platform.

8. The vehicle of claim 7 further comprising a robot mounted on said lift table.

9. The vehicle of claim 3 further wherein said mobile platform comprises wheels or caterpillars on motor driven articulated mechanisms and said one of said two or more electric motors used for locomotion of said mobile platform are said articulated mechanism driving motor.

10. The vehicle of claim 9 further comprising a mechanism attached to said mobile platform configured to actuate an attached tool, said attached mechanism having others of said two or more motors for operating said attached mechanism.

11. The vehicle of claim 3 wherein said mobile platform has three or more omni-directional wheels for locomotion each with an associated one of three or more of said two or more motors.

12. The vehicle of claim 1 further comprising a switching unit mounted on said vehicle to connect to said drive inverter unit only that one of said two or more motors that is to receive power from said drive inverter unit at said given time.

13. The vehicle of claim 1 further comprising legged mechanisms for locomotion each with an associated motor.

14. The vehicle of claim 1 further comprising a combination of wheels and legged mechanisms for locomotion each with an associated motor.

15. The vehicle of claim 1, further comprising visual detection means configured to provide detection data of said vehicle for remote control of said vehicle.

16. A method for electrically powering a vehicle having at least an actuated mechanism and two or more electric motors with only one motor of said two or more motors powered at a given time and at least one drive inverter unit connects to said two or more motors, said method comprising:

using one of said two or more motors for traction for said vehicle;

using all others of said two or more motors for other than traction of said vehicle, said all others of said two or more motors comprising one or more electric motors connected to said at least one actuated mechanism; and sharing between said two or more electric motors said at least one drive inverter unit for delivering electric power to only one motor of said two or more motors, said at least one drive inverter unit only delivering at a given time electric power to that one of said two or more motors that is powered at said given time;

storing for each of said two or more motors that is not powered at said given time an associated set of parameters and configuration data in order to provide data; and controlling the vehicle by using said data.

17. The method of claim 16 further comprising:

storing said set of parameter and configuration data of two or more different motors of said two or more motors switching between the motors during runtime of said vehicle, provided that each of said motors is not moving.

18. The method of claim 16 further comprising:

providing visual detection means on said vehicle in order to provide detection data of said vehicle; and remotely controlling said vehicle by using said detection data received from said detection means.

* * * * *